United States Patent [19]
Fukushi et al.

[11] Patent Number: 5,658,670
[45] Date of Patent: Aug. 19, 1997

[54] MULTI-LAYER COMPOSITIONS HAVING A FLUOROPOLYMER LAYER

[75] Inventors: Tatsuo Fukushi; Paul J. Wang, both of Woodbury, Minn.

[73] Assignee: Minnesota Mining and Manufacturing Company, St. Paul, Minn.

[21] Appl. No.: 516,165

[22] Filed: Aug. 17, 1995

Related U.S. Application Data

[63] Continuation-in-part of Ser. No. 499,431, Jul. 7, 1995, abandoned, which is a continuation-in-part of Ser. No. 293,223, Aug. 19, 1994, abandoned.

[51] Int. Cl.$^6$ ................................................. B32B 27/00
[52] U.S. Cl. ...................... 428/421; 156/243; 156/281; 156/306.3; 524/252
[58] Field of Search ..................... 156/243, 306.3, 156/281; 428/421; 524/252; 359/538

[56] References Cited

U.S. PATENT DOCUMENTS

| | | |
|---|---|---|
| 3,190,178 | 6/1965 | McKenzie . |
| 3,551,025 | 12/1970 | Bingham et al. . |
| 3,645,822 | 2/1972 | Widiger et al. ............... 156/243 |
| 3,923,574 | 12/1975 | Vercauteren ................ 428/421 |
| 4,025,159 | 5/1977 | McGrath . |
| 4,335,238 | 6/1982 | Moore et al. . |
| 4,348,312 | 9/1982 | Tung . |
| 4,415,706 | 11/1983 | Staas . |
| 4,513,060 | 4/1985 | Vasta . |
| 4,548,867 | 10/1985 | Ueno et al. ................. 428/421 |
| 4,558,142 | 12/1985 | Holland et al. . |
| 4,685,090 | 8/1987 | Krevor . |
| 4,896,943 | 1/1990 | Tolliver et al. . |
| 4,933,060 | 6/1990 | Prohaska et al. . |
| 5,047,287 | 9/1991 | Horiuchi et al. . |
| 5,066,098 | 11/1991 | Kult et al. . |
| 5,069,964 | 12/1991 | Tolliver et al. . |
| 5,135,985 | 8/1992 | Hoess et al. . |
| 5,170,011 | 12/1992 | Martucci . |
| 5,242,976 | 9/1993 | Strassel et al. . |
| 5,280,060 | 1/1994 | Abe et al. ................... 524/252 |
| 5,284,184 | 2/1994 | Noone et al. . |
| 5,284,892 | 2/1994 | Brodie et al. ............... 524/252 |
| 5,391,426 | 2/1995 | Wu ............................ 428/421 |
| 5,411,779 | 5/1995 | Nakajima et al. ........... 428/421 |
| 5,472,784 | 12/1995 | Röber et al. . |
| 5,474,822 | 12/1995 | Röber et al. . |
| 5,500,263 | 3/1996 | Röber et al. . |
| 5,512,342 | 4/1996 | Röber et al. . |

FOREIGN PATENT DOCUMENTS

| | | |
|---|---|---|
| 0 045 070 | 2/1982 | European Pat. Off. . |
| 0 094 215 | 11/1983 | European Pat. Off. . |
| 0 185 590 | 6/1986 | European Pat. Off. . |
| 0 456 267 | 11/1991 | European Pat. Off. . |
| 0 523 644 | 1/1993 | European Pat. Off. . |
| 0 545 368 | 6/1993 | European Pat. Off. . |
| 0 551 094 | 7/1993 | European Pat. Off. . |
| 0 559 445 | 9/1993 | European Pat. Off. . |
| 0 618 390 | 10/1994 | European Pat. Off. . |
| 0 649 738 | 4/1995 | European Pat. Off. . |
| 0 649 739 | 4/1995 | European Pat. Off. . |
| 0 650 004 | 4/1995 | European Pat. Off. . |
| 2 204 932 | 11/1991 | United Kingdom . |
| WO93/01493 | 1/1993 | WIPO . |
| WO94/12580 | 6/1994 | WIPO . |
| WO94/25524 | 11/1994 | WIPO . |
| WO95/11464 | 4/1995 | WIPO . |
| WO95/11466 | 4/1995 | WIPO . |
| WO95/11943 | 5/1995 | WIPO . |
| WO96/21820 | 7/1996 | WIPO . |

OTHER PUBLICATIONS

F.W. Billmeyer, *Textbook of Polymer Science*, 3rd ed., pp. 398–406, John Wiley & Sons, New York (1984).

Brullo, R.A., "Fluoroelastomer Rubber for Automotive," *Automotive Elastomer & Design*, Jun. 1985.

Brullo, R.A., "Fluoroelastomers Seal Up Automotive Future," *Materials Engineering*, pp. 36–40, Oct. 1988.

Kirk–Othmer, *Encyclopedia of Chemical Technology*, "Fluorinated Elastomers," 3rd ed., vol. 8, pp. 500–515, John Wiley & Sons, New York (1979).

Kirk–Othmer, *Encyclopedia of Chemical Technology*, "Organic Fluorine Compounds," vol. 11, pp. 20, 21, 32, 33, 40, 41, 48, 50, 52, 62, 70, and 71, John Wiley & Sons, New York (1980).

Feiring et al., "Materials, Advances in Fluoroplastics," *Plastics Engineering*, pp. 27–30, (Jun. 1994).

"Control of Functionality in Glutarimide Polymers" from Research Disclosure No. 321, pp. 68A–68B, Emsworth, GB (Jan. 1991).

*Primary Examiner*—John J. Gallagher
*Attorney, Agent, or Firm*—Gary L. Griswold; Walter N. Kirn; John A. Burtis

[57] ABSTRACT

A method for increasing the adhesion of a first layer comprising fluoropolymer to a second layer comprising a melt-processable, substantially non-fluorinated polymer is disclosed. The method comprises mixing, preferably in a melt, an aliphatic di- or polyamine of less than 1,000 molecular weight with the melt-processable, substantially non-fluorinated polymer. The resulting multi-layer compositions and articles comprising the composition are also disclosed.

19 Claims, No Drawings

MULTI-LAYER COMPOSITIONS HAVING A FLUOROPOLYMER LAYER

CROSS-REFERENCE TO RELATED APPLICATIONS

This is a continuation-in-part of application Ser. No. 08/499,431 filed Jul. 7, 1995 which is a continuation-in-part of application Ser. No. 08/293,223 filed Aug. 19, 1994, both now abandoned.

FIELD OF THE INVENTION

The invention relates to multi-layer compositions comprising a fluoropolymer layer, in particular, a fluoropolymer comprising interpolymerized units derived from vinylidene fluoride. In another aspect, this invention relates to methods of improving the adhesion between the fluoropolymer layer and other dissimilar materials, such as polyamides, polyurethanes, and polyolefins.

BACKGROUND OF THE INVENTION

Fluorine-containing polymers, or fluoropolymers, are an important class of polymers and include for example, fluoroelastomers and fluoroplastics. Within this class are polymers of high thermal stability and usefulness at high temperatures, and extreme toughness and flexibility at very low temperatures. Many of these polymers are almost totally insoluble in a wide variety of organic solvents. See, for example F. W. Billmeyer, *Textbook of Polymer Science*, 3rd ed., pp. 398–403, John Wiley & Sons, New York (1984).

Fluoroelastomers, particularly the copolymers of vinylidene fluoride with other ethylenically unsaturated halogenated monomers, such as hexafluoropropene, have particular utility in high temperature applications, such as seal gaskets and linings. See, for example, Brullo, R. A., "Fluoroelastomer Rubber for Automotive Applications," *Automotive Elastomer & Design*, June 1985, "Fluoroelastomers Seal Up Automotive Future," *Materials Engineering*, October 1988, and "Fluorinated Elastomers," Kirk-Othmer, *Encyclopedia of Chemical Technology*, 3rd ed., Vol. 8, pp. 500–515, John Wiley & Sons, New York (1979).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, in wire, electrical components, seals, solid and lined pipes, and pyroelectric detectors. See, for example, "Organic Fluorine Compounds," Kirk-Othmer, *Encyclopedia of Chemical Technology*, Vol. 11, pp. 20, 21, 32, 33, 40, 41, 48, 50, 52, 62, 70, and 71, John Wiley & Sons, New York (1980).

Increased concerns with evaporative fuel standards have led to a need for fuel system components that have increased barrier properties to minimize the permeation of fuel vapors through automotive components such as fuel filler lines, fuel supply lines, fuel tanks, and other components of the emission control system of the engine. Various types of tubing have been proposed to address these concerns. In general, the most successful of these have been co-extruded multi-layer tubing.

Multi-layer compositions comprising a fluorinated polymer layer and a polyamide or polyolefin layer are known. See, for example, U.S. Pat. No. 4,685,090 (Krevor) which discloses laminate tubular articles which can comprise layers of fluorocarbon elastomers, and PCT Publication WO 93/1493 (LaCourt) which discloses a laminar film structure comprising a polyimide and a fluoropolymer. The use of fluorinated polymers in retroreflective sheeting is also known. See for example U.S. Pat. Nos. 3,551,025 and 4,348,312 for products including glass microspheres, and PCT WO 95/11466 and WO 95/11464 for products containing retroreflective cube corner arrays.

A variety of methods have been used to increase the adhesion between a fluorinated polymer layer and a polyamide or polyolefin layer. For example, an adhesive layer can be added between the two polymer layers. U.S. Pat. No. 5,047,287 discloses a diaphragm, suitable for use in automotive applications, which comprises a base fabric having bonded to at least one surface a fluororubber layer by an adhesive which includes an acrylonitrile-butadiene or acrylonitrile-isoprene rubber having an amino group. See also, for example, European Patent Application 05595445 (Nishino et al.), UK Patent 2,204,932 (Washizu). See also U.S. Pat. No. 5,242,976 (Strassel et al.) which discloses coextruding vinylidene polyfluoride with an alkyl polymethacrylate and vinylidene polyfluoride composition.

Sometimes surface treatment of one or both of the layers is used to help increase bonding. For example, fluoropolymer layers have been treated with charged gaseous atmosphere followed by applying a layer of a second material, for example thermoplastic polyamide. See, for example, European Patent Applications 0185590 (Ueno et at.) and 0551094 (Krause et at.) and U.S. Pat. Nos. 4,933,060 (Prohaska et al.) and 5,170,011 (Martucci).

Blends of the two layers are sometimes used as an intermediate layer to help bond the two layers together. European Patent Application 0523644 (Kawashima et at.) discloses a plastic laminate having a polyamide resin surface layer and a fluororesin surface layer. The application states that it is difficult to make laminates having a polyamide layer and a fluororesin layer due to the incompatibility of the two materials. The laminate is prepared by the use of an intermediate layer of a blend of an aliphatic polyamide resin with a fluorine-containing graft copolymer.

SUMMARY OF THE INVENTION

Briefly, in one aspect, the present invention provides a method for increasing the adhesion of a first layer comprising fluoropolymer to a second layer comprising melt-processable, preferably thermoplastic, substantially non-fluorinated polymer, comprising the steps of (A) mixing a melt-processable aliphatic di- or polyamine of less than 1,000 molecular weight with a melt-processable composition comprising said substantially non-fluorinated polymer; and (B) forming a multi-layer composition comprising a layer comprising the mixture resulting from step A and a layer comprising said fluoropolymer; wherein said two layers are in substantial contact, said fluoropolymer comprises interpolymerized units derived from vinylidene fluoride, said melt-processable, substantially non-fluorinated polymer is a polyamide, polyimide, polyurethane, or a carboxyl, anhydride, or imide functional polyolefin, and said di- or polyamine is present in an amount sufficient to increase the adhesion between the two layers compared to compositions without said di- or polyamine. Preferably said first layer is predominantly fluoropolymers and said second layer is predominantly melt-processable, non-fluorinated polymers. Sometimes, in order to obtain sufficient adhesion, it may be desirable or necessary to further treat the resulting multi-layer composition, for example by additional heat or pressure.

In another aspect, the present invention provides a multi-layer composition comprising a first layer comprising fluoropolymer, a second layer comprising melt-processable, substantially non-fluorinated polymer, and a melt-processable aliphatic di- or polyamine of less than 1,000 molecular weight, wherein said fluoropolymer comprises interpolymerized units derived from vinylidene fluoride, said substantially non-fluorinated polymer is a polyamide, polyimide, polyurethane, or a carboxyl, anhydride, or imide functional polyolefin, substantially all of said amine is located in said second layer, and said amine is present in an amount sufficient to increase the adhesion between said layers compared to compositions without said di- or polyamine. The invention also provides articles comprising the compositions of this invention. Preferably said first layer is predominantly fluoropolymers and said second layer is predominantly melt-processable, non-fluorinated polymers.

The invention also provides multi-layer compositions and articles with improved inter-layer adhesion. The methods and compositions of this invention are particularly useful for making articles, such as tubing and hoses suitable for use in motor vehicles, for example as fuel-line hoses, and flexible retroreflective sheetings.

DETAILED DESCRIPTION OF THE INVENTION

Fluoropolymer materials suitable for use in this invention are those comprising interpolymerized units derived from vinylidene fluoride ("$VF_2$" or "VDF"). Preferably such polymers comprise at least 3% by weight of interpolymerized units derived from $VF_2$. Such polymers may be homopolymers of $VF_2$ or copolymers of $VF_2$ and other ethylenically unsaturated monomers.

Such $VF_2$ polymers and copolymers can be made by well-known conventional means, for example by free-radical polymerization of $VF_2$ with or without other ethylenically-unsaturated monomers. For example, the preparation of colloidal, aqueous dispersions of such polymers and copolymers is described, for example, in U.S. Pat. No 4,335,238. It follows the customary process for copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid. Useful fluorine-containing monomers include hexafluoropropene (HFP), tetrafluoroethylene (TFE), chlorotrifluoroethylene (CTFE), 2-chloropentafluoro-propene, perfluoroalkyl vinyl ethers, e.g. $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Holland et al.). Certain fluorine-containing diolefins are also useful, such as perfluorodiallylether and perfluoro-1,3-butadiene. Said fluorine-containing monomer may also be copolymerized with fluorine-free terminally unsaturated monoolefin comonomers, e.g., ethylene or propylene. Preferably at least 50% by weight of all monomers in a polymerizable mixture are fluorine-containing. Said fluorine-containing monomer may also be copolymerized with iodine- or bromine-containing cure-site monomers in order to prepare peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1.

Useful fluoropolymer materials include commercially available fluoropolymers, for example, THV 500 fluoropolymer (available from 3M), Kynar™ 740 fluoropolymer (available from Elf Atochem North America, Inc.), and Fluorel™ FC-2178 fluoropolymer (available from 3M).

The di- or polyamines useful in this invention are aliphatic amines of molecular weight less than 1,000. By "aliphatic" is meant that the nitrogen atoms of at least two amino groups in the compound are bonded directly to only hydrogen atoms or to aliphatic carbon atoms rather than being bonded directly to aromatic moieties or functional groups (e.g., carboxyl). For example, as "aliphatic amine" is used in this specification and claims, aniline and urea are not aliphatic amines. Secondary amines are more preferred than tertiary amines and primary amines are most preferred. Most preferred are alkylene polyamines or diamines that comprise at least two primary amines, such as hexamethylene diamine, dodecyl diamine, and 2,4,8,10-tetraoxaspiro[5,5] undecane-3,9-dipropanamine.

Polyamides useful as the substantially non-fluorinated polymer are generally commercially available. For example, polyamides such as any of the well-known Nylons are available from a number of sources. Particularly preferred polyamides are nylon 6, nylon 6,6, nylon 11, or nylon 12. It should be noted that the selection of a particular polyamide material should be based upon the physical requirements of the particular application for the resulting article. For example, nylon 6 and nylon 6,6 offer higher heat resistant properties than nylon 11 or nylon 12, whereas nylon 11 and nylon 12 offer better chemical resistant properties. In addition to those polyamide materials, other nylon material such as nylon 6,12, nylon 6,9, nylon 4, nylon 4,2, nylon 4,6, nylon 7, and nylon 8 may also be used. Ring containing polyamides, e.g., nylon 6,T and nylon 6,I, may also be used. Polyether containing polyamides, such as Pebax™ polyamines, may also be used.

Useful polyurethane polymers include aliphatic, cycloaliphatic, aromatic, and polycyclic polyurethanes. These polyurethanes are typically produced by reaction of a polyfunctional isocyanate with a polyol according to well known reaction mechanisms. Useful diiisocyanates for employment in the production of a polyurethane include dicyclohexylmethane-4,4'-diisocyanate, isophorone diisocyanate, 1,6-hexamethylene diisocyanate, cyclohexyl diisocyanate, diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders, such as butanediol or hexanediol, may also optionally be used in the reaction. Commercially available urethane polymers useful in the present invention include: PN-04 or 3429 from Morton International, Inc., Seabrook, N.H., and X-4107 from B. F. Goodrich Company, Cleveland, Ohio.

The polyolefin polymers useful as the substantially non-fluorinated polymer are generally homopolymers or copolymers of ethylene, propylene, acrylic monomers, or other ethylenically unsaturated monomers, for example, vinyl acetate. Such polymers and copolymers can be prepared by conventional free-radical polymerization of such ethylenically unsaturated monomers. The degree of crystallinity of the hydrocarbon polymer or copolymer is not critical. The polymer may, for example, be a semi-crystalline high density polyethylene or may be an elastomeric copolymer of ethylene and propylene. Although not necessary to the performance of the hydrocarbon polymer within the present invention, carboxyl, anhydride, or imide functionalities may be incorporated into the polymer or copolymer by polymerizing or copolymerizing functional monomers, for example, acrylic acid or maleic anhydride, or by modifying a polymer after polymerization, for example by oxidation. The carboxyl, anhydride, or imide functional polymers useful as the hydrocarbon polymer are generally commercially available. For example, acid modified ethylene vinyl acetates, acid modified ethylene acrylates, anhydride modified ethylene acrylates, anhydride modified ethylene vinyl acetates, anhydride modified polyethylenes, and anhydride modified polypropylenes are available from DuPont as Bynel™ coextrudable adhesive resins.

In addition to the melt-processable aliphatic di- or polyamine, the compositions of the present invention having a first layer comprising a fluoropolymer and a second layer comprising a hydrocarbon polymer may contain one or more tackifiers to improve inter-layer adhesion. Although suitable tackifiers vary greatly in chemical structure, the most useful tackifier compounds generally will have a softening point between approximately 90° C. and 150° C. Preferably, tackifiers used in accordance with this invention are combined along with a suitable di- or polyamine and incorporated into the hydrocarbon polymer-containing layer to comprise between 1 and 50 weight percent of the hydrocarbon layer.

Tackifiers useful for this purpose include any of the tackifier compounds known to improve adhesion performance characteristics of elastomer-based adhesives. Such compounds include, for example, the following: rosins, including gum rosins, tall oil rosins, wood rosins, polymerized rosins, hydrogenated rosins, and disproportionated rosins; rosin esters, including pentaerythritol-wood rosins, pentaerythritol-stabilized rosins, and glycerine-hydrogenated wood rosins; hydrocarbon resins, including aliphatic and cycloaliphatic resins, aromatic resins, petroleum resins, and dicyclopentadiene; terpenes, including alpha-pinene, beta-pinene, d-limonene, and polyterpenes; and pure monomer resins, including styrene resins, styrene/AMS resins, and AMS/vinyl toluene resins.

Commercially available tackifiers useful in this invention include Arkon™ P-125 tackifier, a hydrogenated C9 aromatic hydrocarbon, and Super Ester™ W-125 modified rosin ester tackifier, both available from Arakawa Chemical USA., Inc.; and Piccolyte™ S115 terpene resin tackifier, available from Hercules, Inc.

The mixing of the di- or polyamine may be by conventional means. For example, the di or polyamine can be melt-processed with the second layer material, for example nylon. In some cases the di or polyamine may react with the second layer material such that the second layer material becomes modified. For example, a diamine such as 1,12 dodecyl diamine (DDDA) may be blended into a polyamide such as nylon 12, resulting in a modified nylon. The modified nylon and a vinylidene fluoride monomer unit-containing fluoropolymer could then be coextruded to form a multi-layer article, such as a film or a tube.

The heat and pressure of the method by which the layers are brought together, for example normal coextrusion processes, may be adequate to provide sufficient adhesion. However, it may be desirable to further treat the resulting multi-layer composition, for example, with additional heat or pressure or both. One way of supplying extra heat when the multi-layer composition is prepared by extrusion is by delaying the cooling of the composition because the composite is hot as a result of the coextrusion process. Where additional heating or pressure is desired, it may be accomplished by performing the steps of applying or coextruding at a temperature higher than necessary for merely processing the several components. Alternatively, the finished article may be held at an elevated temperature for an extended period of time, or the finished article may be placed in a separate means for elevating the temperature of the article, such as an oven or heated liquid bath. A combination of these methods may also be used.

The methods of this invention provide multi-layer compositions with improved inter-layer adhesion. The methods and compositions of this invention are particularly useful for making articles, such as tubing and hoses, suitable for use in motor vehicles, for example as fuel-line hoses, and for films and blow-molded articles such as bottles where chemical resistance or barrier properties are important. The two-layer compositions of this invention are also useful in preparing compositions having three or more layers. For example, a three layer composition of fluoropolymer to anhydride modified polyolefin to unmodified polyolefin could be prepared and might be useful in a fuel-tank construction.

Transparent embodiments of multi-layer compositions of the present invention may find particular utility in the construction of retroreflective sheeting articles generally, and particularly when resistance to chemical agents, solvents, soils, reduced moisture vapor transmission or good interlayer adhesion in flexible sheetings subject to severe bending and flexing is required.

The compositions of this invention may be rendered retroreflective by forming retroreflective elements on one side of the composition, or alternatively, by attaching a retroreflective base sheet by means of a transparent adhesive or by direct lamination. The retroreflective base sheet may comprise a member with cube corner retroreflective elements or may comprise a microsphere-based retroreflective structure, e.g. comprising a monolayer of transparent microspheres and reflective means disposed on the opposite side of the monolayer from the multi-layer composition. It is preferred that the base layer is disposed on the non-fluoropolymer layer of the multi-layer composition. An embodiment of this invention includes the encapsulated retroreflective sheeting article as is disclosed in U.S. Pat. No. 3,190,178, in which the cover layer is provided by a multi-layer composition according to the present invention.

Retroreflective articles of the invention may be made in rigid or flexible form. Multi-layer compositions of the present invention may be used as barrier layers. An embodiment of the present invention includes articles in accordance with U.S. Pat. No. 5,069,964 which is incorporated herein by reference, in which the plasticiser resistant barrier layer comprises a multi-layer composition in accordance with the present invention. The multi-layer compositions of the present invention may find particular utility in the construction of flexible retroreflective sheeting articles. A preferred embodiment of the present invention includes a retroreflective article in accordance with PCT WO 95/11464 or PCT/WO 95/11943, both of which are incorporated herein by reference, wherein the flexible overlay film described in PCT WO 95/11464 or the flexible body layer of PCT/WO 95/11943 is constituted by a multi-layer composition in accordance with this invention. Suitable fluoropolymers comprising interpolymerized units of vinylidene fluoride of the type specified for use with flexible sheeting in accordance with these two patent applications may be poly (vinylidene fluoride-co-hexafluoropropylene), for example, Kynar Flex™-2800 available from Elf Atochem Noah America, Inc., Philadelphia, Pa., or poly (tetrafluoroethylene-co-hexafluoropropylene-vinylidene fluoride), for example, THV 200 or 500 available from 3M, St. Paul, Minn. The non-fluoropolymer layer of the present invention in such constructions may be any of the non-fluoropolymers specified in the above patent applications, for example, ionomeric ethylene copolymers, low density polyethylenes, polyethylene copolymers, or aliphatic or aromatic polyurethanes or similar compounds. For highly flexible products, a multi-layer composition of this invention that include a THV layer and a polyurethane layer is particularly preferred. The micro structure elements including either solidly connected or segregated cube corners may be microreplicated, preferably onto the non-fluoropolymer layer. Alternatively, the multi-layer compositions may be adhered to microstructure elements. As will be understood, any conventional form of retroreflective microstructure elements may be used including, for example, arrays of canted, tiled, specially shaped, colored, or colorless cube corner elements.

Similarly, multi-layer compositions according to the present invention may be used with retroreflective sheeting products including microspheres in a base layer. Specific embodiments of the invention include retroreflective articles according to U.S. Pat. No. 4,896,943, U.S. Pat. No. 4,025,159 or U.S. Pat. No. 5,066,098, all of which are included herein by reference, in which the cover film of U.S. Pat. Nos. 4,896,943 or 4,025,159 or the cover sheet of U.S. Pat. No. 5,066,098 is constituted by a multi-layer composition in accordance with this invention. Further, the multi-layer compositions of the present invention may themselves include retroreflective micro-elements, such as transparent microspheres, incorporated into the fluoropolymer or the non-fluoropolymer layer, for example in a further embodiment of the present invention, the fluoropolymer layer of a multi-layer composition according to the present invention may constitute the continuous overlaying transparent top-coat of U.S. Pat. No. 3,551,025 which is incorporated here by reference and the non-fluoropolymer layer may constitute the binder of the same.

EXAMPLES

In the following Examples and Comparative Examples various multi-layer compositions were prepared and the adhesion between the layers was evaluated. All concentrations and percentages are by weight unless otherwise indicated.

Example 1

In Example 1, a 4 inch by 4 inch (10 cm by 10 cm) diamine-containing nylon sheet was prepared by melting 46 g of Vestamid™ L2140 nylon 12, available from Hüls Aktiengesellschaft, using a Rheomix™ 600 internal bowl mixer equipped with roller blades, available from Haake Buchler Instruments Inc., set at a temperature of 200° C. and a mixer rotor setting of 10 rpm. After mixing the melted nylon for 1 minute, 0.23 g (0.5% by wt.) of 1,12-dodecyl diamine (DDDA), available from Aldrich Chemical Co., Inc., was added to and mixed into the melted nylon. During the next 2 minutes, the temperature was gradually cooled down to 180° C. and the speed on the mixer rotor was increased to 50 rpm. The temperature and the rotor speed were then held for 3 minutes. The internal bowl-mixed, diamine-containing nylon was then removed from the mixer and molded at 177° C. into a sheet about 20 mils (508 micro meters) thick using a 20 mil shim stock and a Wabash Hydraulic Press Co. heated platen press. After cooling to room temperature, the sheet was cut into a square 4 in. by 4 in. (10 cm by 10 cm). A composite was made with the sheet of internal bowl-mixed, diamine-containing nylon and 3 layers of 10 mil (254 micro meters) thick sheets of a terpolymer of tetrafluoroethylene (TFE), hexafluoropropylene (HFP) and vinylidene fluoride (VDF), made from resin available from 3M Co. as THV 500. An 18 mil (457 micro meters) thick sheet of unmodified Vestamid™ L2140 nylon 12 was applied to the other side of the internal bowl-mixed, diamine-containing nylon sheet giving a final structure of a layer of unmodified nylon 12, the middle layer of a internal bowl-mixed, diamine-containing nylon sheet and a third layer of the three 10 mil (254 micro meters) sheets of THV 500.

The adhesion between the layers was tested using ASTM D-1876, commonly known as a "T-peel" test. To facilitate testing via the T-peel test, a sheet of 3 mil (76.2 micro meters) polyester (PET) film coated with a silicone release agent was placed between the internal bowl-mixed, diamine-containing nylon 12 layer and the THV layer and a second sheet was placed between the internal bowl-mixed, diamine-containing nylon 12 layer and the nylon 12 layer. The release-coated PET films were both inserted about 2.5 cm only along the same edge of the 4 inch by 4 inch (10 cm by 10 cm) sample. The sheet of polyester did not adhere to any of the layers and was used only to create a THV "tab" and a nylon 12 "tab" to insert into the jaws of a test device. A "middle" tab of internal bowl-mixed, diamine-containing nylon was also present, but not used during the test.

The resulting composite was heated under pressure using a Wabash Hydraulic Press Co. heated platen press at 177° C. and 3.5 psi (24 kPa) for 3 minutes. The sample was removed from the press and allowed to cool to room temperature. The resulting sample was cut into three 1-inch (2.54 cm) wide strips. Peel strength or adhesion was measured on the three strips in accordance with ASTM D 1876 (T-Peel Test). An Instron™ Model 1125 tester, available from Instron Corp., set at a 100 mm/min crosshead speed was used as the test device. If there were many peaks recorded on the graph from the T-peel test, the peel strength was calculated in accordance with ISO 6133-'81. The value reported was the average of testing three samples. The average peel strength on the strips from Example 1 is reported in Table 1.

Comparative Examples C1 and C2

In Comparative Examples C1 and C2, samples were prepared and tested as in Example 1 except a nylon 12 sheet was applied directly to the THV 500 sheets without a middle layer of internal bowl-mixed, diamine-containing nylon. The time in the press and the test results are summarized in Table 1.

Example 2 and 3

In Examples 2 and 3, samples were prepared and tested as described in Example 1 except the amount of DDDA additive was varied as shown in Table 1. The time in the press and the test results are summarized in Table 1.

Example 4

In Example 4, a sample was prepared and tested as in Example 1 except 1.0% Jeffamine™ EDR-148 polyoxyalkylene polyamine, available from Texaco Inc., was used instead of the DDDA. The time in the press and the test results are summarized in Table 1.

Comparative Example C3

In Comparative Example C3, a sample was prepared and tested as in Example 1 except 0.23 g of octadecyl amine (ODA), available from Aldrich Chemical, was added to the nylon instead of DDDA. The time in the press and the test results are summarized in Table 1.

Example 5

In Example 5, a sample was prepared and tested as in Example 1 except the internal bowl-mixed, diamine-containing nylon layer was replaced by a nylon layer which had been prepared by soaking an 18 mil (457 micro meters) sheet of the unmodified nylon 12 used in Example 1, in a 5% HMDA methanol solution for 18 hours and drying the soaked sheet at 80° C. for 2 hours. The time in the press and the test results are summarized in Table 1.

Comparative Example C4

In Comparative Example C4, a sample was prepared and tested as in Example 1, except the amount of DDDA added to the nylon was only 0.1%. The time in the press and the test results are summarized in Table 1.

TABLE 1

| Example # | Nylon Modifier | Time (Min.) | Peel (kg/2.54 cm) |
|---|---|---|---|
| 1 | 0.5% DDDA | 3 | 16.8 |
| 2 | 0.3% DDDA | 3 | 13.0 |
| 3 | 1.0% DDDA | 3 | 22.8 |
| 4 | 1.0% Jeffamine ™ EDR-48 | 3 | 22.5 |
| C3 | 0.5% ODA | 3 | 1.2 |
| 5 | 0.5% HMDA soak | 3 | 7.6 |
| C1 | — | 3 | 0.2 |
| C2 | — | 6 | 0.2 |
| C4 | 0.1% DDDA | 3 | 0.1 |

The data in Table 1 show that substantially improved adhesion between the layers may be obtained if a sufficient amount of a diamine component is added to a nylon layer. Substantial improvements are achieved over the samples without any or only low levels of diamine modifier. The mono-amine of Comparative Example C3 showed only a minor improvement over the control without amine.

Example 6

In Example 6, a sample was prepared and tested as in Example 1 except the diamine and nylon were melt blended using a Rheomex™ TW 100 conical twin-screw extruder with high intensity screws, available from Haake Buchler Instruments Inc., instead of the Haake Rheomix™ 600 internal bowl mixer. Prior to adding the materials to the extruder, 2000 g of Vestamid™ L2140 nylon 12 pellets, and 11.06 g of DDDA (0.55% by wt.) ground to a fine powder by using a mortar, were pre-mixed in a plastic bottle by hand shaking. The pre-mixed blend was fed to the twin-screw extruder by a AccuRate™ solids feeder and extruded as a strand at 230° C. and 150 rpm giving a through-put rate of 39 g/min. The extrudate was quenched in a water bath and pelletized. The resulting extruder-mixed, diamine-modified nylon pellets were then molded as in Example 1 at 177° C. into a 20 mil (508 micro meters) thick sheet. The sample was prepared and tested in the same manner as described in Example 1 except the extruder-mixed, diamine-containing nylon sheet was used instead of the internal bowl-mixed, diamine-containing sheet. Test results and process conditions are summarized in Table 2.

Example 7

In Example 7, a sample was prepared and tested as in Example 6 except Grilamid™ L25W40X nylon 12, available from EMS-Chemie AG, was used in the extruder-mixed, modified-nylon layer and the unmodified nylon layer instead of Vestamid™ L2140 nylon 12. Test results and process conditions are summarized in Table 2.

Example 8–10

In Examples 8–10, samples were prepared to simulate a process, such as coextrusion. These samples were prepared using the three materials described in Example 6, but preheating the three components for 3 minutes at 177° C., then pressing the three components together with the extruder-mixed, diamine-modified, nylon 12 sheet between the THV 500 fluoropolymer and the nylon 12 sheets, but at a lower pressure of 0.75 psi (5 kPa) and the other process conditions as shown in Table 2. The samples were then tested in same way as described in Example 1. Test results and process conditions are summarized in Table 2.

Comparative Example C5

In Comparative Example C5, a sample was prepared and tested as in Example 9 except the time in the press was shortened as shown in Table 2. Test results and process conditions are summarized in Table 2.

TABLE 2

| Example # | Time (Min.) | Temp. °C. | Pressure (kPa) | Peel (kg/2.54 cm.) |
|---|---|---|---|---|
| 6 | 3 | 177 | 24 | 24.1 |
| 7 | 3 | 177 | 24 | 21.5 |
| 8 | 1 | 177 | 5 | 1.0 |
| 9 | 1 | 204 | 5 | 4.0 |
| 10 | 3 | 204 | 5 | 24.5 |
| C5 | 0.5 | 204 | 5 | 0.1 |

The data in Table 2 show substantial adhesion improvements are possible under properly selected process conditions.

Examples 11

In Example 11, a polyurethane polymer was evaluated for bonding to a fluoropolymer. Samples were prepared in an identical manner as for Example 1 except that 0.23 g (0.5% by wt.) of 1,12-dodecyldiamine (DDDA), available from Aldrich Chemical Co., Inc., was blended with 46 grams of PE-192 polyurethane, available from Morton International, Inc. A three-layer composite sheet was prepared for testing as in Example 1 comprising a sheet of THV 500, a sheet of the above prepared composition, and a sheet PE-192 polyurethane. The average peel strength of the strips is reported in Table 3.

Example 12

In Example 12, samples of the invention were prepared and tested as in Example 11, except that the three-layer sheet comprised THV 200, a sheet of the prepared composition of Example 11, and a sheet of Morton PN03-214 urethane. The average initial peel strengths of the strips are reported in Table 3. Tests carded out one week later demonstrated that the composite strip had become inseparable due possibly to the continuation of the bonding reaction at room temperature.

Comparative Example C6

In Comparative Example C6, samples were prepared as in Example 11, except that a sheet of PE-192 polyurethane was applied directly to the THV 500 sheet without a middle layer of internal bowl-mixed, diamine-containing polyurethane. The average peel strength of the strips is reported in Table 3.

TABLE 3

| Example | DDDA (%) | Time (Min.) | Peel (kg/2.54 cm) |
|---|---|---|---|
| 11 | 0.5 | 3 | 1.5 |
| 12 | 0.5 | 3 | 2.0 |
| C6 | — | 3 | 0.1 |

Examples 13 and 14

In Examples 13 and 14, carboxyl-containing hydrocarbon elastomers were evaluated for bonding to THV 500. Samples were prepared as in Example 1 except a diamine was added to a hydrocarbon elastomer which was used instead of the sheet of nylon 12 used in Example 1. The ingredients used in each sheet of elastomer were compounded on a two-roll mill using conventional methods. The DIAK™#1 and DIAK™#3 contained the diamine functionalities in a blocked form. The compositions of the compounded elastomer sheets are summarized in Table 4. All amounts referred to therein are in parts per 100 parts by weight rubber abbreviated "phr". Table 5 lists the sources for the ingredients shown in Table 4. A sheet about 2 mm thick was formed from each elastomer composition by using the two-roll mill. Samples of the invention were then prepared as in Example 1 except using the above prepared elastomer sheets instead of the nylon 12 sheet. The samples were then held in the press at 177° C. for 6 minutes instead of 3 minutes. Test results are summarized in Table 6.

TABLE 4

Preparation of Elastomers

| | ACM | Vamac |
|---|---|---|
| Hytemp ™ 4051EP | 100 | |
| Vamac ™ HGB-124 | | 124 |
| N-774 Carbon Black | | 35 |
| N-550 Carbon Black | 65 | |
| Stearic Acid | 1 | 2 |
| Armeen 18D | | 0.5 |
| Diak ™ #1 | | 1.25 |
| Diak ™ #3 | 3 | |
| AgeRite Stalite S | 1 | |
| Diphenylguanidine | | 4 |

TABLE 5

| Chemical | Source |
|---|---|
| Hytemp ™ 4051EP (acrylic ester copolymer) | Zeon Chemical |
| Vamac ™ HGB-124 (ethylene/acrylic rubber) | DuPont |
| Stearic acid | EM Science |
| Armeen ™ 18D (octadecyl amine) | Armak Co. |
| Diak ™ #1 (hexamethylene diamine carbamate) | DuPont |
| Diak ™ #3 (N,N'-dicinnamilidene-1,6-hexandiamine) | DuPont |
| AgeRite Stalite ™ S (anti-oxidant) | R. T. Vanderbilt |
| DPG (diphenyl guanidine) | American Cyanamid |

Example 15

In Example 15, a 508 micrometer thick molded sheet of an amine-modified olefin was made by mixing 0.23 g of DDDA with 46 g Bynel™ 4003 adhesive resin, an anhydride-modified HDPE (AM-HDPE), available from DuPont, in the internal mixer as in Example 1. A sample of the invention was made using the sheet of the amine-containing Bynel™ 4003 AM-HDPE bonded to the THV 500 sheet. A sheet of unmodified LS901046 HDPE, available from Quantum, was placed on the other surface of the amine-containing Bynel™ 4003 AM-HDPE sheet. The resulting three layer sample was pressed and tested as in Example 1. Test results are summarized in Table 6.

Example 16

In Example 16, a sample was prepared and tested as in Example 15, except DDDA was mixed into oxidized polyethylene with an acid number of 15 mg KOH per g, available from Aldrich Chemical, at 100° C. and the resulting amine-containing oxidized polyethylene was used for the middle layer. Test results are summarized in Table 6.

All Examples shown in Table 6 were run at a pressure of 3.5 psi (24 kPa).

TABLE 6

| Example | Substrate | Time (Min.) | Peel (kg/2.54 cm) |
|---|---|---|---|
| 13 | ACM | 6 | 14.6 |
| 14 | Vamac | 6 | 4.5 |
| 15 | 0.5% DDDA in HDPE | 3 | 21.1 |
| 16 | 5.0% DDDA in oxidized PE | 3 | 0.8 |

The data in Table 6 show that the methods of this invention are useful for increasing the bonding to carboxyl-containing and anhydride-containing polyolefins.

Example 17

In Example 17, a 508 micro meter thick molded sheet amine-containing polyolefin was made by mixing 0.5% of DDDA with Bynel™ 1123 adhesive resin, said to be an acid-modified ethylene vinyl acetate (AC-EVA), available from DuPont, in the internal mixer as in Example 1. A sample of the invention was made using the sheet of the amine-containing Bynel™ 1123 AC-EVA bonded to the THV 500 sheet. A sheet of Kal-Glas™ polyvinylchloride, available from Ellay, Inc., was placed on the other surface of the amine-containing Bynel™ 1123 AC-EVA sheet. The resulting three layer sample was pressed and tested as in Example 1. Test results are summarized in Table 7.

Example 18

In Example 18, a sample of the invention was made as in Example 17, except the fluoropolymer was a terpolymer of tetrafluoroethylene (TFE), hexafluoropropylene (HFP) and vinylidene fluoride (VDF), made from resin available from 3M Co. as THV 200, instead of THV 500. The process conditions were changed as summarized in Table 7. Test results are summarized in Table 7.

Example 19

In Example 19, a sample of the invention was made as in Example 17, except 46 g of an anhydride-modified polypropylene, Bynel™ E302 adhesive resin, available from DuPont, was used instead of the Bynel™ 1123 acid modified EVA. Also, a sheet of Santoprene™ thermoplastic elastomer, available from Advanced Elastomers Systems, was used as the outer layer instead of the PVC layer. The three layers were pressed using the conditions in Table 6 and tested as in Example 1. Test results are summarized in Table 7.

All Examples shown in Table 7 were run at a pressure of 3.5 psi (24 kPa).

TABLE 7

| Example | Temperature °C. | Time (Min.) | Peel (kg/2.54 cm) |
|---------|-----------------|-------------|-------------------|
| 17 | 177 | 6 | 5.8 |
| 18 | 162 | 3 | 0.8 |
| 19 | 177 | 10 | 8.5 |

Example 19 illustrates the usefulness of the method of this invention in preparing compositions with three or more layers.

Example 20

In Example 20, a sample was prepared and tested as in Example 1, except the nylon 12 layer was replaced by a nylon layer which had been prepared by first soaking nylon 12 pellets in a 5% HMDA methanol solution for 18 hours and drying at 80° C. for 2 hours, and then pressing the resulting dried pellets into an 18 mil (457 micro meters) sheet as in Example 1. The nylon modifier and the test results are summarized in Table 8.

TABLE 8

| Example | Nylon Modifier | Time (Min.) | Pressure (psi) | Peel (kg/in.) |
|---------|----------------|-------------|----------------|---------------|
| 20 | 0.5% HMDA soak | 3 | 3.5 | 7.6 |

Example 21

In Example 21, a molded sheet of a 508 micrometers thick amine-modified polymer was made by mixing 0.23 g of DDDA with 46 g of Admer™ SF600 polyolefin based resin, available form Mitsui Petrochemicals America Co., having a density of 0.88 g/cm³ and a melt flow rate measured in accordance with ASTM D 1238 at 190° C. under 2.16 kg of 3.3 g/10 rain and believed to be a blend of AM-HDPE and a ethylene/propylene copolymer with a tackifier, in an internal mixer as was done for Example 1. A sample of the invention was then prepared by bonding the sheet of the amine-containing Admer™ SF600 resin to a sheet of THV 500 fluoroplastic. A sheet of unmodified LS901046 high density polyethylene (HDPE), available form Quantum Corp., was placed on the opposing side of the amine-containing Admar™ SF600 resin sheet. The resulting three layer sample was pressed and tested as in Example 1. Table 9 summarizes the test results.

Example 22–25

In Examples 22–25, samples were prepared and tested as in Example 21, except that, respectively, Admer™ SF700A, SF710A, SE800, and SE810 polyolefin resins, available form Mitsui Petrochemicals America Co., having densities of 0.88, 0.90, 0.90, and 0.89 g/cm³ respectively, melt flow rates measured in accordance with ASTM D 1238 at 190° C. under 2.16 kg of 1.0, 3.4, 4.4, and 7.2 g/10 min respectively, and all believed to be blends of AM-HDPE and a ethylene/propylene copolymer with a tackifier, were used in place of Admer™ SF600. Test results and process conditions are summarized in Table 9.

Comparative Example C7

In comparative Example C7, a sample was prepared and evaluated as in Example 21, except that DDDA was not added to the Admer™ SF600. Test results and process conditions for this comparative sample are summarized in Table 9.

TABLE 9

| Example | DDDA (%) | Time (Min.) | Peel (kg/2.45 cm) |
|---------|----------|-------------|-------------------|
| 21 | 0.5 | 1 | 10.8 |
| 22 | 0.5 | 1 | 6.7 |
| 23 | 0.5 | 1 | 1.5 |
| 24 | 0.5 | 1 | 4.0 |
| 25 | 0.5 | 1 | 6.5 |
| C7 | — | 1 | 0.1 |

The data of Table 9 demonstrate that the samples of the present invention that contain a diamine exhibit much improved layer adhesion.

Examples 26–27

In Examples 26 and 27, samples were prepared in a manner designed to simulate co-extrusion. These samples were prepared using the three layers described in Example 21, preheating the three components for 3 minutes at 260° C. and pressing the three layers together with the extruder-mixed, diamine-modified polymer sheet between the THV 500 fluoroplastic and the HDPE sheets at a pressure of 5 kPa under the process conditions shown in Table 10. The samples were tested in the same manner as described for Example 21.

TABLE 10

| Example | Time (sec.) | Temp (°C.) | Pressure (kPa) | Peel (kg/2.45 cm) |
|---------|-------------|------------|----------------|-------------------|
| 26 | 10 | 260 | 5 | 10.0 |
| 27 | 20 | 260 | 5 | 10.5 |

The data of Table 10 show substantial adhesion improvements under properly selected process conditions for those samples containing a diamine over those samples not containing a di- or polyamine.

Examples 28–29

In examples 28 and 29, samples were prepared and tested as in Example 21 except that, respectively, Vestamid™ L2140 nylon 12, available form Hüls Aktiengesellschaft, and Santoprene™ 201-73 thermoplastic elastomer, having a Shore A hardness of 73 and a specific gravity of 0.98, available form Advanced Elastomer Systems, Inc., were used in place of the HDPE substrate sheet. Test results and process conditions are summarized by Table 11.

TABLE 11

| Example | Substrate | Time (min.) | Peel (kg/2.45 cm) |
|---------|-----------|-------------|-------------------|
| 28 | nylon 12 | 1 | 3.4 |
| 29 | Santoprene | 1 | 4.5 |

Example 30

In Example 30, a 508 micrometer thick molded sheet of an amine-modified polymer composite was made by mixing 0.23 g of DDDA with 32.2 g of Polysar™ EPM 306 ethylene propylene rubber, available form Bayer, Inc., and 2.3 g of Bynel™ 4003 adhesive resin, an anhydride-modified HDPE available form E.I. du Pont de Nemours and Company, and 11.5 g of Arkon™ P-125 tackifier, a hydrogenated C9 aromatic hydrocarbon resin tackifier (softening point 125° C.) available form Arakawa Chemical USA Inc., in an internal mixer as in Example 1. A sample of the invention was then prepared by bonding the sheet of the amine-containing Polysar™ EPM 306 rubber to a sheet of THV 500 fluoroplastic according to the method described in Example 1. A sheet of unmodified LS901046 HDPE, available form Quantum Corp., was placed on the opposing surface of the amine-containing polymer composite sheet. The resulting three layer sample was pressed and tested as in Example 1. The time in the press and test results are summarized by Table 12.

Example 31

In Example 31, a sample was prepared and tested as in Example 30 except that Piccolyte™ S115 terpene resin tackifier (softening point 115° C.), available form Hercules, Inc., was used in place of the Arkon™ P-125 tackifier. Test results and process conditions for this sample are summarized by Table 12.

Example 32

In Example 32, a sample was prepared and tested as in Example 30 except that Super Ester™ W-125 modified rosin ester tackifier (softening point 125° C.), available form Arkawa Chemical USA, Inc., was used in place of the Arkon™ P-125 tackifier. Test results and process conditions for this sample are summarized by Table 12.

Comparative Example C8

For Comparative Example C8, a sample was prepared and evaluated as in Example 30 except that DDDA was not added to the polymer composite. Test results and corresponding process conditions for this comparative sample are summarized by Table 12.

TABLE 12

| Example | Tackifier | DDDA (%) | Time (min.) | Peel (kg/2.45 cm) |
|---|---|---|---|---|
| 30 | hydrocarbon resin | 0.5 | 1 | 6.5 |
| 31 | terpene resin | 0.5 | 1 | 8.1 |
| 32 | rosin ester | 0.5 | 1 | 1.5 |
| C8 | hydrocarbon resin | — | 1 | 0.1 |

The data of Table 12 demonstrate substantially improved adhesion speed between layers may be obtained by addition of both a tackifier and a diamine to the polymer composite.

Examples 33-34

In Examples 33 and 34, a 508 micrometer thick molded sheet of an amine-modified polymer composite was made by mixing 0.23 g of DDDA with 46.0 g of Polysar™ EPM 306 ethylene propylene rubber, available form Bayer, Inc., in an internal mixer as in Example 1. A sample of the invention was then prepared by bonding the sheet of the amine-containing Polysar™ EPM 306 rubber to a sheet of THV 500 fluoroplastic according to the method described in Example 1. A sheet of unmodified LS901046 HDPE, available form Quantum Corp., was placed on the opposing surface of the amine-containing polymer composite sheet. The resulting three layer sample was pressed and tested as in Example 1. The time in the press and test results for each example are summarized by Table 13.

Comparative Example C9

For Comparative Example C9, a sample was prepared and evaluated as for Examples 33-34 except that DDDA was not added to the polymer composite. Test results and corresponding process conditions for this comparative sample are summarized by Table 13.

TABLE 13

| Example | DDDA (%) | Time (min.) | Peel (kg/2.45 cm) |
|---|---|---|---|
| 33 | 0.5 | 1 | 1.7 |
| 34 | 0.5 | 3 | 2.4 |
| C9 | — | 1 | * |

*The layers of this sample did not sufficiently adhere to one another to perform the test.

The data of Table 13 demonstrate that samples of the invention that contain a diamine and wherein the hydrocarbon polymer component comprises an elastomeric copolymer of ethylene and propylene exhibit much improved layer adhesion.

Example 35

In Example 35, a sample of the invention was prepared in the same manner as for Examples 33 and 34 except that 11.5 g of Arkon™ P-125 tackifier, a hydrogenated C9 aromatic hydrocarbon resin tackifier (softening point 125° C.) available form Arakawa Chemical USA Inc., was added to the ethylene propylene rubber along with the diamine, and that only 34.5 g of the ethylene propylene rubber was used. The resulting three layer sample was pressed and tested as in Example 1, and the time in the press and test results are summarized by Table 14.

Example 36

In Example 36, a sample was prepared and tested as in Example 35, except 10 mil (0.25 mm) thickness sheet of Kynar™ 740 polyvinylidene fluoride (PVDF), available from Atochem, was used in place of the THV 500 fluoropolymer. The time in the press and test results are summarized in Table 14.

Comparative Example C 10

For Comparative Example C10, a sample was prepared and evaluated as for Example 35 except that DDDA was not added to the polymer composite. Test results and corresponding process conditions for this comparative sample are summarized by Table 14.

TABLE 14

| Example | Substrate | DDDA (%) | Time (min.) | Peel (kg/2.45 cm) |
|---|---|---|---|---|
| 35 | THV 500 | 0.5 | 1 | 6.5 |
| 36 | PVDF | 0.5 | 1 | 5.5 |
| C10 | THV 500 | — | 1 | * |

The layers of this sample did not sufficiently adhere to one another to perform the test.

The data of Table 14 again demonstrate the improved inter-layer adhesion according to this invention using both a diamine and a tackifier.

Examples 37–38

In Examples 37 and 38, a 508 micrometer thick molded sheet of an amine-modified polymer composite was made by mixing 0.23 g of DDDA with 34.5 g of Bynel™ 4003 adhesive resin, an anhydride-modified HDPE available form E.I. du Pont de Nemours and Company, and 11.5 g of Arkon™ P-125 tackifier, a hydrogenated C9 aromatic hydrocarbon resin tackifier (softening point 125° C.) available form Arakawa Chemical USA Inc., in an internal mixer as in Example 1. A sample of the invention was then prepared by bonding the sheet of the amine-containing Bynel™ 4003 resin to a sheet of THV 500 fluoroplastic according to the method described in Example 1. A sheet of unmodified LS901046 HDPE, available form Quantum Corp., was placed on the opposing surface of the amine-containing polymer composite sheet. The resulting three layer sample was pressed and tested as in Example 1. The time in the press and test results are summarized by Table 15.

TABLE 15

| Example | DDDA (%) | Time (min.) | Peel (kg/2.45 cm) |
|---|---|---|---|
| 37 | 0.5 | 1 | 0.5 |
| 38 | 0.5 | 3 | 0.5 |

The data of Table 15 demonstrate, that although not a preferred embodiment of the this invention, the addition of a tackifier and a diamine to anhydride-modified HDPE exhibits some improved adhesion characteristics over those samples that do not contain a di- or polyamine, for example as shown by Comparative Example C8. Preferred embodiments incorporate an amorphous hydrocarbon polymer along with the HDPE to enhance the performance of the tackifier, if one is employed.

Example 39

THV 200 was extruded onto a 61 micrometer thick, low shrinkage polyethylene terephthalate film to form a 12.71o 25.4 micrometer thick layer. In a second pass a 50.8 to 76.2 micrometer thick layer of urethane (Morton L424.167) and a 12.7 micrometer thick tie layer comprising a blend of urethane (Morton L424.167) and 0.5% dodecyl diamine (Aldrich Chemical) were co-extruded onto the THV layer with the tie layer adjacent to the THV layer.

The resulting multi-layer composition was provided with a base layer by micro-replicating with retroreflective cube corners in accordance with the method described in PCT WO 95/11464 which is incorporated here by reference, in particular with FIG. 4 of the document and the associated description. A mixed acrylate solution (19.8% bisphenol A diacrylate, 29.7% tetrahydrofuran acrylate and 49.5% trimethylol propane triacrylate with Daracure™ D4265 as the photoinitiator) was coated onto the urethane layer followed by micro-replicating by the method indicated above. The acrylate cube corners were first cured with visible light and then annealed with ultraviolet light. The retro-reflective properties of the multi-layer composition were measured to be in the range 700 to 1200 candle power at an observation angle of 0.33° and an entrance angle of –4°.

The exposed cube corner layer was ultrasonically sealed with a 114.4 micrometer thick white urethane layer. A 127 micrometer layer of plasticiser resistant acrylate pressure sensitive adhesive was applied to the exposed surface of the white urethane layer and the complete multi-layer composition laminated to a 585 micrometer thick layer of blue canvas (Duraskin™ manufactured by Verseidag, Germany) comprising a polyester scrim impregnated with polyvinyl chloride.

The resultant material was subjected to a test simulating the folding and vibration of a retroreflective product applied to the flapping canvas covering of a truck being driven at low temperatures. The laminated sample was cut into squares of 34.9 mm×34.9 mm. These squares were clamped individually between the steel jaws of a flexing tester (Dauerknickpmefer MP 49, manufactured by Karl Schroeder, Germany) with the jaws set initially at a distance of 25.4 mm. The flexing tester was housed in a refrigerator (So-Low Environmental, Cincinnati) and the temperature reduced to –20° C. (–4° F.) and maintained at this temperature for the remainder of the test. The flexing tester was operated so that the distance between the jaws reciprocated between 25.4 mm and 4.75 mm at 2 cycles per second, the sample being tightly folded between the jaws at the minimum position with the THV layer forming the outermost layer of the fold. The samples withstood 2000 cycles without visible cracking or delamination of the layers.

Example 40

THV 200, a blend of urethane (Morton L424.167) and dodecyl diamine (Aldrich Chemical) and urethane (Morton L424.167) were triple co-extruded to form a multi-layer composition comprising a 12.7 to 25.4 micrometer thick THV layer, a 12.7 micrometer thick tie layer and a 50.8 to 76.2 micrometer thick urethane layer. The resulting composite layer was tested in a Permatran™ W6 instrument (Modem Controls, Inc., Minneapolis, Minn.) for moisture vapor transmission rate with the THV layer facing the source of moisture. The instrument temperature was set at 38° C. with 100% humidity from deionized water. Before each measurement, the instrument was calibrated with a polyester film sample supplied by the manufacturer. The moisture vapor transmission values for a composition in accordance with Example 39 are given in Table 16.

Example 41

A THV/tie layer/urethane layer was manufactured and tested as in Example 40 above except THV 200 was used for the THV layer. The moisture vapor transmission values for this composition are given in Table 16.

Comparative sample C 11

A film was manufactured from extruded polyurethane (Morton L424.167) and an application of ADSD 6912 two-part crosslinking polyurethane clear coat available from 3M, having a total thickness of 152.4 micrometer.

TABLE 16

| Example | Average Thickness (micrometer) | Average Moisture Transmission Rate (g/mm²/day) |
|---|---|---|
| 40 | 122 | 38.1 |
| 41 | 135 | 38.0 |
| C11 | 150 | 115.0 |

Various modifications and alterations of this invention will be apparent to those skilled in the art without departing from the scope and spirit of this invention and this invention should not be restricted to that set forth herein for illustrative purposes.

We claim:

1. A method for increasing the adhesion of a first layer comprising fluoropolymer to a second layer comprising a melt-processable, substantially non-fluorinated polymer, comprising the steps of
   (A) mixing an aliphatic di- or polyamine of less than 1,000 molecular weight with a melt-processable composition comprising said substantially non-fluorinated polymer;
   (B) forming a multi-layer composite comprising a layer comprising the mixture resulting from step A and a layer comprising said fluoropolymer; wherein said two layers are in substantial contact, said fluoropolymer comprises interpolymerized units derived from vinylidene fluoride, said substantially non-fluorinated polymer is a polyamide, polyimide, polyurethane or a carboxyl, anhydride, or imide functional polyolefin, and said di- or polyamine is present in an amount sufficient to increase the adhesion between the two layers compared to composites prepared without said di- or polyamine.

2. The method of claim 1 wherein said mixing is done above the softening point or melting point of said hydrocarbon polymer.

3. The method of claim 1 wherein said forming step is co-extrusion of said two layers.

4. The method of claim 1 further comprising the step of heating or applying pressure to said multi-layer composite.

5. The method of claim 1 further comprising the step of applying at least one additional layer to at least one side of the resulting multi-layer composite.

6. The method of claim 1 wherein said polyamide is a nylon.

7. The method of claim 1 wherein said fluoropolymer comprises at least 3% by weight of interpolymerized units derived from vinylidene fluoride.

8. The method of claim 1 wherein said fluoropolymer is derived from vinylidene fluoride and one or more monomers selected from the group consisting of tetrafluoroethylene and hexafluoropropene.

9. The method of claim 1 wherein said fluoropolymer is a fluoroplastic.

10. The method of claim 1 wherein said amine comprises at least one primary amine.

11. The method of claim 1 wherein said amine is an alkylene di-primaryamine.

12. The method of claim 1 wherein said amine is hexamethylene diamine or dodecyl diamine.

13. The method of claim 1 wherein said first layer is composed predominantly of fluoropolymers and said second layer is composed predominantly of substantially non-fluorinated polymers.

14. The method of claim 1 wherein said first layer consists essentially of fluoropolymers and said second layer consists essentially of substantially non-fluorinated polymers.

15. The method of claim 1 wherein said substantially non-fluorinated polymer is thermoplastic.

16. The method of claim 15 wherein said mixing is done above the melting point of said substantially non-fluorinated polymer.

17. A method for increasing the adhesion of a first layer comprising fluoropolymer to a second layer comprising a melt-processable, substantially non-fluorinated polymer, comprising the steps of
   (A) mixing an aliphatic di- or polyamine of less than 1,000 molecular weight with a tackifier and a melt-processable composition comprising said substantially non-fluorinated polymer;
   (B) forming a multi-layer composite comprising a layer comprising the mixture resulting from step A and a layer comprising said fluoropolymer; wherein said two layers are in substantial contact, said fluoropolymer comprises interpolymerized units derived from vinylidene fluoride, said substantially non-fluorinated polymer is a polyamide, polyimide, polyurethane, or a carboxyl, anhydride, or imide functional polyolefin, and said di- or polyamine is present in an amount sufficient to increase the adhesion between the two layers compared to composites prepared without said di- or polyamine.

18. An article made according to the method of claim 17.

19. A method for increasing the adhesion of a first layer comprising fluoropolymer to a second layer comprising a melt-processable, substantially non-fluorinated polymer, comprising the steps of
   (A) mixing an aliphatic di- or polyamine of less than 1,000 molecular weight with a melt-processable composition comprising said substantially non-fluorinated polymer;
   (B) forming a multi-layer composite comprising a layer comprising the mixture resulting from step A and a layer comprising said fluoropolymer; wherein said two layers are in substantial contact, said fluoropolymer is a homopolymer of vinylidene fluoride, said substantially non-fluorinated polymer is a polyamide, polyimide, polyurethane or a carboxyl, anhydride, or imide functional polyolefin, and said di- or polyamine is present in an amount sufficient to increase the adhesion between the two layers compared to composites prepared without said di- or polyamine.

* * * * *